United States Patent [19]

Saeki

[11] Patent Number: 5,615,216
[45] Date of Patent: Mar. 25, 1997

[54] SEMICONDUCTOR INTEGRATED CIRCUIT INCLUDING TEST CIRCUIT

[75] Inventor: Yukihiro Saeki, Yokohama, Japan

[73] Assignee: Kabushiki Kaisha Toshiba, Kawasaki, Japan

[21] Appl. No.: 262,835

[22] Filed: Jun. 21, 1994

[30] Foreign Application Priority Data

Jun. 22, 1993 [JP] Japan ................................. 5-150432

[51] Int. Cl.$^6$ .................................................. G01R 31/02
[52] U.S. Cl. ..................... 371/22.1; 371/22.6; 324/765; 324/523
[58] Field of Search ................... 371/22.1, 27, 21.2, 371/8.1, 20.4, 21.4, 22.2, 22.6, 22.5, 24; 324/158.1, 73.1, 750, 765, 763, 766, 768, 769, 500, 522, 523, 527; 364/488, 490, 551.01

[56] References Cited

U.S. PATENT DOCUMENTS

| | | |
|---|---|---|
| 3,758,761 | 9/1973 | Henrion ................................. 371/8.1 |
| 4,758,745 | 7/1988 | Elgamal et al. . | |
| 4,801,869 | 1/1989 | Sprogis ................................. 324/73 R |
| 4,857,774 | 8/1989 | El-Ayat et al. . | |
| 4,873,459 | 10/1989 | El Gamal et al. . | |
| 5,072,175 | 12/1991 | Marek ................................. 324/73.1 |
| 5,083,083 | 1/1992 | El-Ayat ................................. 324/158 R |
| 5,290,734 | 3/1994 | Boardman et al. ................. 437/922 X |
| 5,361,033 | 11/1994 | Houston ................................. 324/158.1 |
| 5,362,676 | 11/1994 | Gordon et al. ....................... 437/922 X |
| 5,365,165 | 11/1994 | El-Ayat et al. ....................... 324/158.1 |
| 5,365,167 | 11/1994 | Tanaka et al. ....................... 324/158.1 |
| 5,373,509 | 12/1994 | Katsura ................................. 371/21.2 |

*Primary Examiner*—Ellis B. Ramirez
*Assistant Examiner*—M. Kemper
*Attorney, Agent, or Firm*—Banner & Witcoff, Ltd.

[57] ABSTRACT

A first test circuit is connected to one end of a first wiring line, and a second test circuit is connected to one end of a second wiring line. The second wiring line serves as a data bus. N-channel MOS transistors, connected in series, are provided between the first and second wiring lines and located below a third wiring line. The transistors are set in a conductive state by a gate control signal from a test control circuit in a test mode, and are set in an OFF state in a normal operation mode. In the normal operation mode, the capacitance between the first and second wiring lines is small and does not adversely affect the operation speed of an integrated circuit.

14 Claims, 7 Drawing Sheets

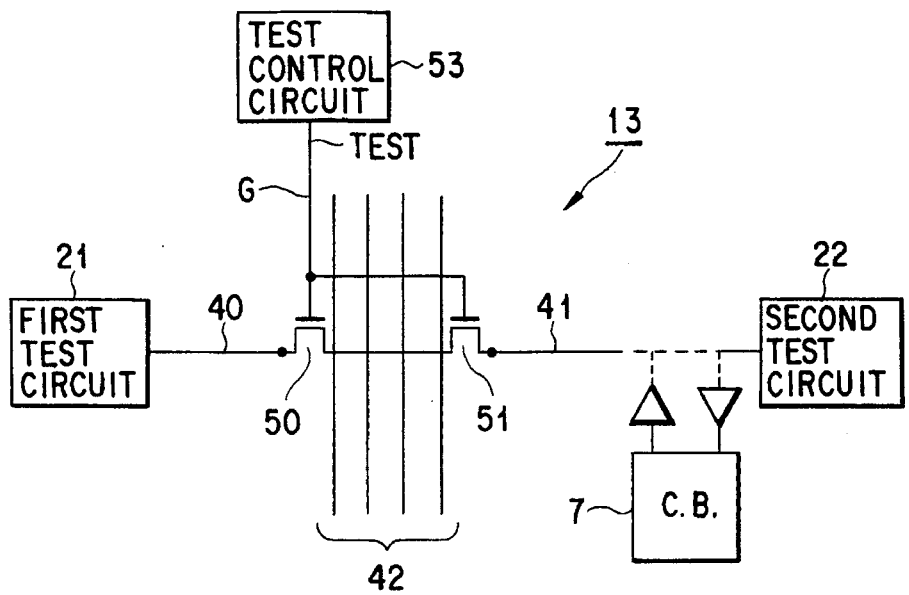
F I G. 1
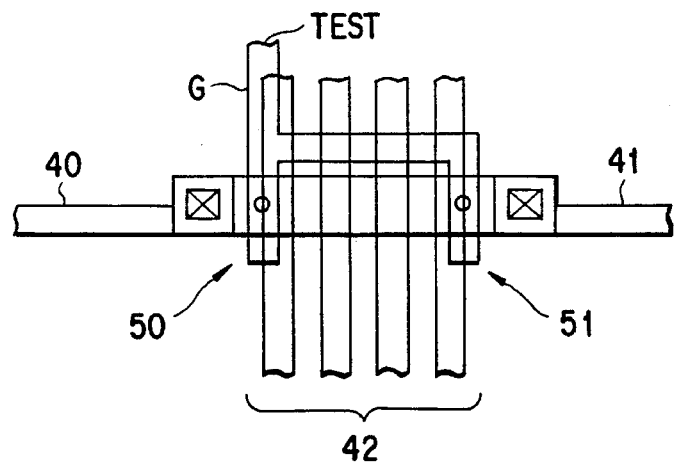
F I G. 2
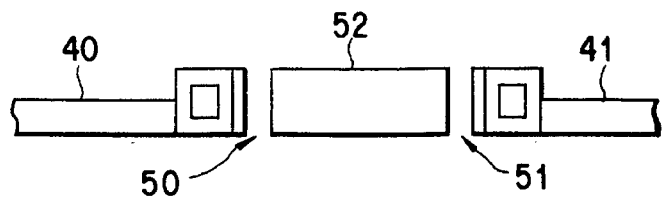
F I G. 3

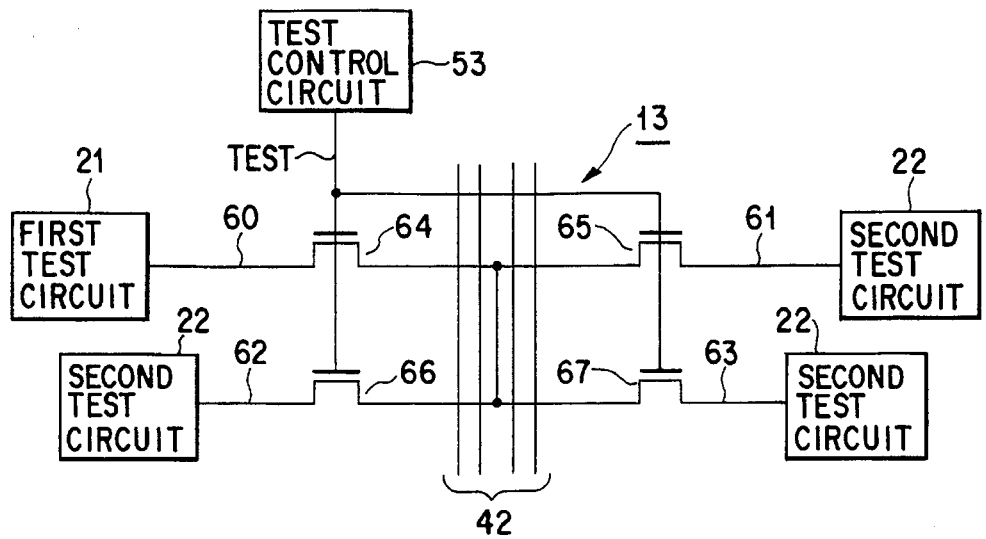
F I G. 4
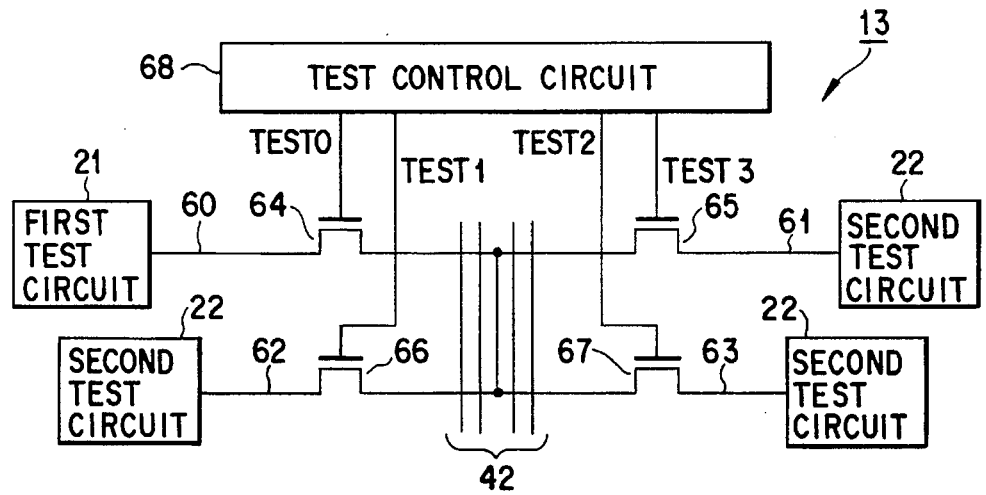
F I G. 5
| TEST CONTROL CIRCUIT<br>WIRING LINE TO BE TESTED | TEST 0 | TEST 1 | TEST 2 | TEST 3 |
|---|---|---|---|---|
| WIRING LINE 61 | 1 | 0 | 0 | 1 |
| WIRING LINE 62 | 1 | 1 | 0 | 0 |
| WIRING LINE 63 | 1 | 0 | 1 | 0 |
F I G. 6

SEMICONDUCTOR INTEGRATED CIRCUIT INCLUDING TEST CIRCUIT

BACKGROUND OF THE INVENTION

1. Field of the Invention

The present invention relates to a semiconductor integrated circuit which includes a test circuit for testing whether or not the wiring lines of the semiconductor integrated circuit work normally.

2. Description of the Related Art

Before an integrated circuit is shipped from a factory, it must be guaranteed that the integrated circuit does not have any defects. In order to confirm that the integrated circuit has no defects, it is necessary to check the integrated circuit by means of a test apparatus.

An integrated circuit is fabricated to attain a certain function, and the test apparatus tests whether or not the fabricated integrated circuit can attain it. The integrated circuit is shipped after the test shows that the integrated circuit does not have any problem.

Integrated circuits developed in recent years are very large in scale, and the functions which have to be attained by use of a single chip are very complex. Since the integrated circuits have to be tested in a large number of points to confirm their functions, testing requires a very long time, resulting in a delay in the shipment of the integrated circuits. In addition, a great expense is required for the test.

In order to make testing easy and quick, an integrated circuit recently developed incorporates not only circuit elements for attaining the required functions, but also test circuits for testing the functions of the integrated circuit. Although a variety of test circuits are provided in accordance with these purposes, a test circuit used for checking the wiring lines of a microcomputer will be briefly described by way of an example.

A comparatively long wiring line, which is generally referred to as a data bus, is incorporated in a semiconductor chip constituting a microcomputer. The circuit elements of the microcomputer exchange data through the data bus.

FIG. 8 shows a conventional microcomputer and depicts one data bus 12. Referring to FIG. 8, circuit blocks 1–9, each made up of various circuits, are arranged on a semiconductor chip 13. Each of the circuit blocks (C.B.) 1–9 is connected to the data bus 12 by way of an input buffer 10 and an output buffer 11. To check whether or not the data bus 12 has an electrical disconnection, the conventional art transfers data from circuit block 1 connected at one end of the data bus 12 toward circuit block 7 connected at the other end of the data bus 12. Then, the conventional art compares the data transmitted from circuit block 1 with the data received by circuit block 7. When these two data are identical to each other, it is determined that the data bus 12 does not have any electrical disconnection.

In the conventional art, however, a complex operation is required for checking the data bus 12. To be more specific, the data bus 12 is checked by the following procedures: setting the data in circuit block 1; transferring the data from circuit block 1 toward circuit block 7; and comparing the data received by circuit block 7 with the data set in circuit block 1. Since these testing procedures are complex, the conventional art inevitably requires a long test time.

FIG. 9 shows another example of a conventional test circuit. In FIG. 9, the same reference numbers as used in FIG. 8 denote structural elements corresponding to those shown in FIG. 8. Referring to FIG. 9, a first test circuit 21 is connected to one end of a data bus 12, and a second test circuit 22 is connected to the other end of the data bus 12. The first and second test circuits do not perform any particular operation when the semiconductor chip 13 is in a normal operation mode. In a test mode, however, the first test circuit 21 has a function of supplying a current to the second test circuit 22 by way of the data bus 12. The second test circuit 22 incorporates a sense amplifier (not shown) used for detecting a current supplied from the first test circuit 21. If the data bus 12 has an electrical disconnection, no current flows from the first test circuit 21 to the second test circuit 22. It is therefore possible to easily check whether or not the data bus 12 has an electrical disconnection. With this circuit configuration, an electrical disconnection of a wiring line can be easily checked, with no need to provide the circuit blocks 1 and 7 mentioned above.

However, in the circuit configuration mentioned above, the first and second test circuits 21 and 22 are connected to the respective ends of one wiring line. Therefore, the integration density of the semiconductor chip is adversely affected. In addition, since a large number of signals are required for controlling the test circuits, the testing method is inevitably complex.

A method for performing the above current conduction test in a simpler way is disclosed in U.S. Pat. No. 4,857,774. According to this U.S. Patent, a large number of wiring lines are connected in series and are checked at one time to detect whether they have an electrical disconnection.

FIG. 10 is a schematic diagram of the circuit disclosed in U.S. Pat. No. 4,857,774. Referring to FIG. 10, a first test circuit 21 is connected to one end of a data bus 12 by way of a wiring line 30 and a switch 31, and a second test circuit 22 is connected to the other end of the data bus 12. In this case, not only the data bus 12, but also the wiring line 30 is checked. The switch 31 is kept OFF in the normal operation mode of the semiconductor chip 13, and is turned on in a test mode in which an electrical disconnection is detected. In the test mode, therefore, the wiring line 30 and the data bus 12 are electrically connected together and can be regarded as constituting a single signal line. In this state, a current is supplied from the first test circuit 21 toward the second test circuit 22 by way of the wiring line 30, the switch 31, and the data bus 12. When the current supplied from the first test circuit 21 is sensed by the second test circuit 22, it is determined that neither the wiring line 30 nor the data bus 12 has an electrical disconnection. Conversely, when the current supplied from the first test circuit 21 is not sensed by the second test circuit 22, it is determined that at least one of the wiring line 30 and data bus 12 has an electrical disconnection.

A large number of wiring lines can be checked at one time in a similar manner. To be specific, switches are provided between the adjacent ones of the wiring lines, and these switches are turned on only when a test is made. This configuration contributes to a reduction in the number of test circuits required, and does not adversely affect the density of integration.

However, the conventional art shown in FIG. 10 will have a problem if the two wiring lines to be connected together by means of a switch are located away from each other. For example, a pattern wherein column-direction wiring lines 42 extend between two row-direction wiring lines 40 and 41, as shown in FIG. 11, is very general in the art. In the pattern shown in FIG. 11, wiring lines 40 and 41 are connected together by means of a single N-channel MOS transistor 43

(a switching element) which is located below wiring lines 42. The transistor 43 is controlled by a gate control signal TEST. In the test mode, the logical level of the gate control signal TEST is set to be "1", and the transistor 43 is turned on in response to this gate control signal. As a result, the wiring lines 40 and 41 are connected together. In the normal operation mode, the logical level of the gate control signal TEST is set to be "0", and the transistor 43 is turned off in response to this gate control signal. As a result, the wiring lines 40 and 41 are electrically disconnected from each other.

FIG. 12A shows a pattern layout corresponding to FIG. 11. As is shown in FIG. 12A, the source of the transistor 43 mentioned above is connected to wiring line 40, and the drain thereof is connected to wiring line 41. Since this transistor is kept off in the normal operation mode, it follows that large capacitors Cp made up of the source or drain are connected to the wiring lines 40 and 41, as shown in FIG. 12B. The capacitance of the capacitors Cp increases with an increase in the distance between the wiring lines 40 and 41. In the normal operation mode, therefore, the signal transmission speed of the wiring lines is greatly lowered by the transistor 43. It should be noted that the test circuits are totally unnecessary in the normal operation mode. Although they are provided for the purpose of simplifying the testing procedures, they undesirably affect the characteristics of the integrated circuit after the test is made.

SUMMARY OF THE INVENTION

The object of the present invention is to provide a test circuit which can reliably test a semiconductor integrated circuit, can suppress adverse effects on the normal operation mode of the semiconductor integrated circuit, particularly the adverse effects on the signal transmission speed of wiring lines, and can prevent a deterioration in the characteristics of the semiconductor integrated circuit.

This object is attained by a test circuit for a semiconductor integrated circuit, comprising:

a first wiring line;

a second wiring line;

a first test circuit, connected to one end of the first wiring line, for outputting a current when a test is made;

a second test circuit connected to one end of the second wiring line; and a plurality of transistors having current paths which are connected in series between another end of the first wiring line and another end of the second wiring line, the transistors being set in a conductive state when the test is made, thereby permitting the current, output from the first test circuit and flowing through the first wiring line, to be supplied to the second test circuit by way of the second wiring line, the second test circuit detecting a current supplied thereto through the second wiring line, when the test is made.

In the present invention, a plurality of transistors are arranged between the first and second wiring lines such that the current paths of the transistors are connected in series. When a test is made, the transistors are turned on to electrically connect the first and second wiring lines together, and a testing current is supplied from the first test circuit toward the second test circuit by way of the wiring lines and the transistors. Although the transistors are turned off in the normal operation mode, the capacitance between the first and second wiring lines is small due to the use of a plurality of transistors. Hence, the operation speed of the integrated circuit is not adversely affected.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a circuit diagram showing one embodiment of the present invention;

FIG. 2 is a planar pattern view showing the major portion of the circuit depicted in FIG. 1;

FIG. 3 is a plan view showing how the circuit depicted in FIGS. 1 and 2 operates;

FIG. 4 is a circuit diagram showing the second embodiment of the present invention;

FIG. 5 is a circuit diagram showing the third embodiment of the present invention;

FIG. 6 shows how the circuit depicted in FIG. 5 operates;

DETAILED DESCRIPTION OF THE PREFERRED EMBODIMENTS

Figure 7:
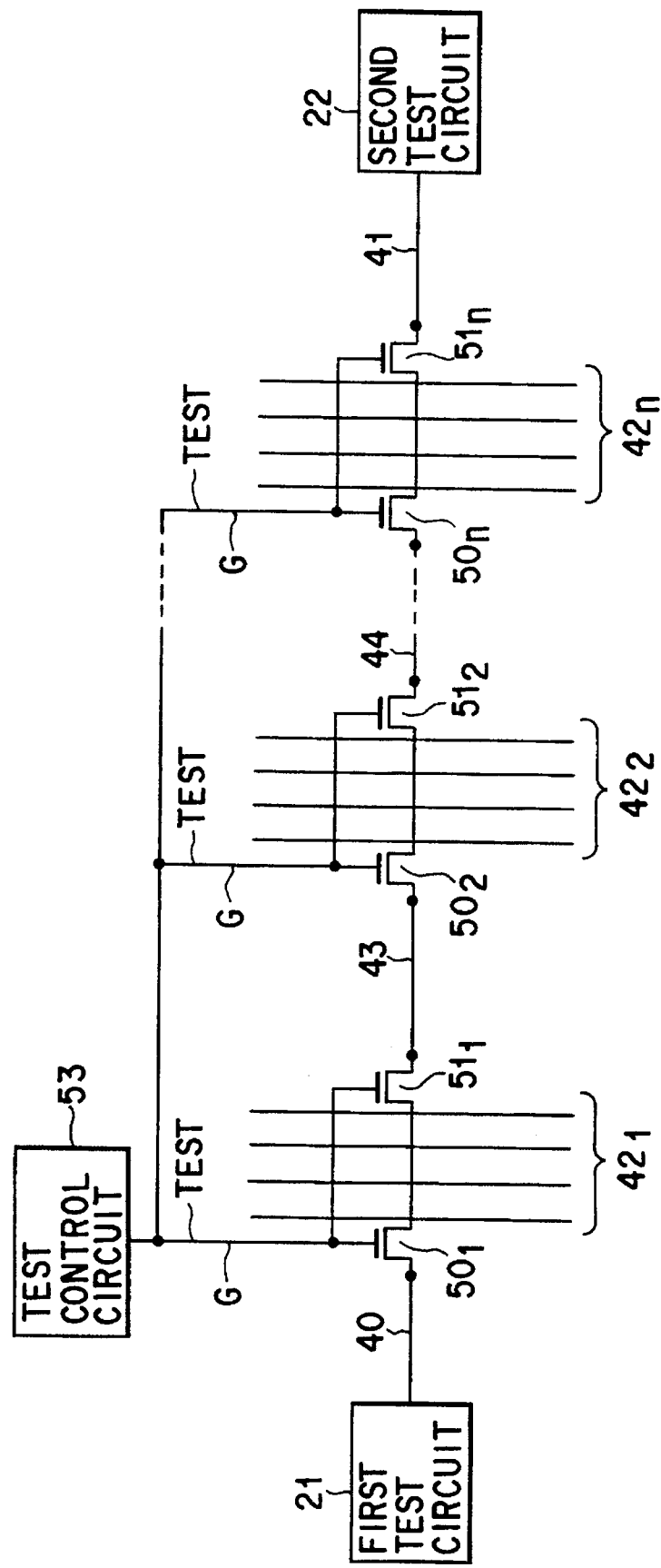
FIG. 7 is a circuit diagram showing the fourth embodiment of the present invention.
Figure 8:
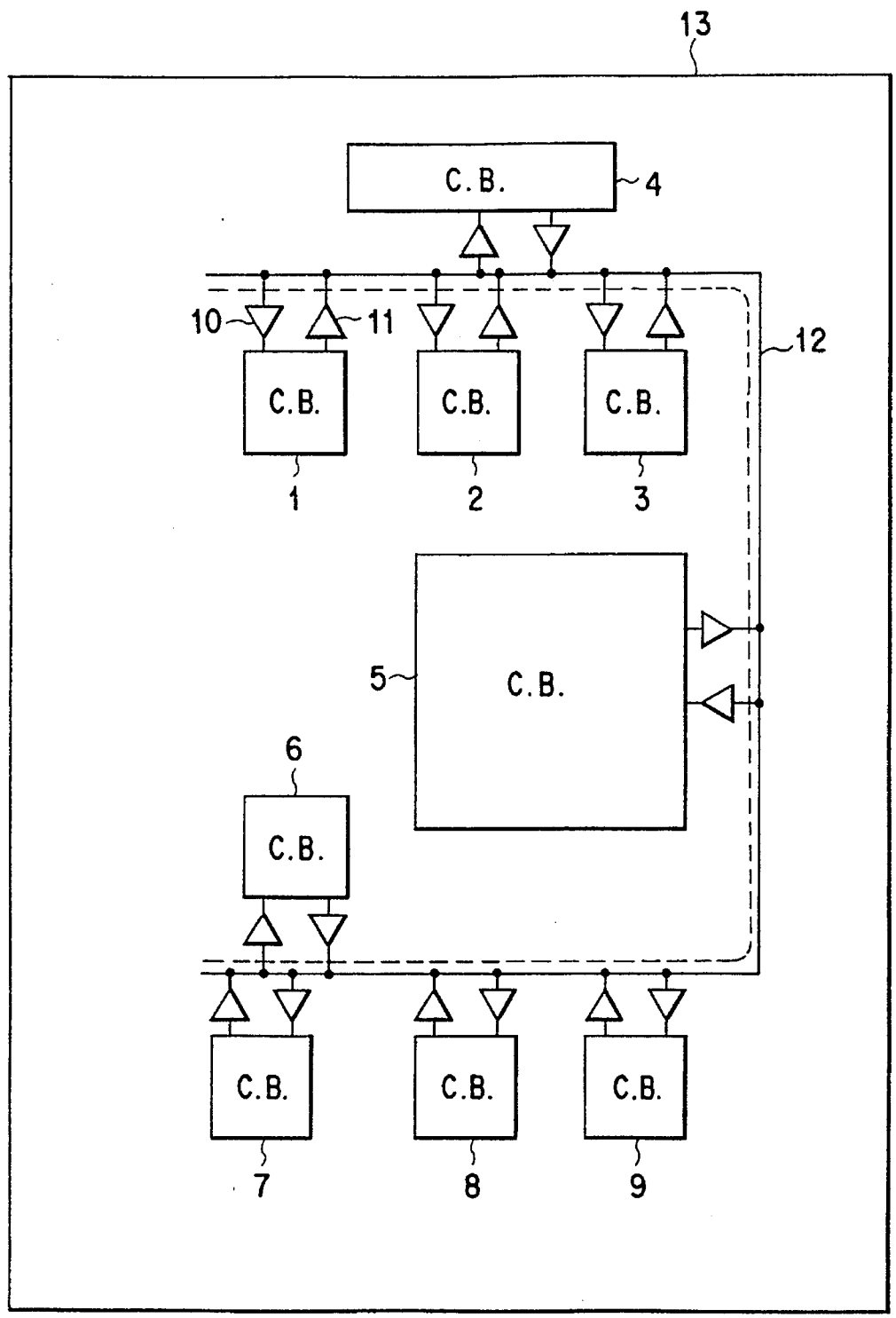
FIG. 8 is a circuit diagram showing one example of a conventional test circuit.
Figure 9:
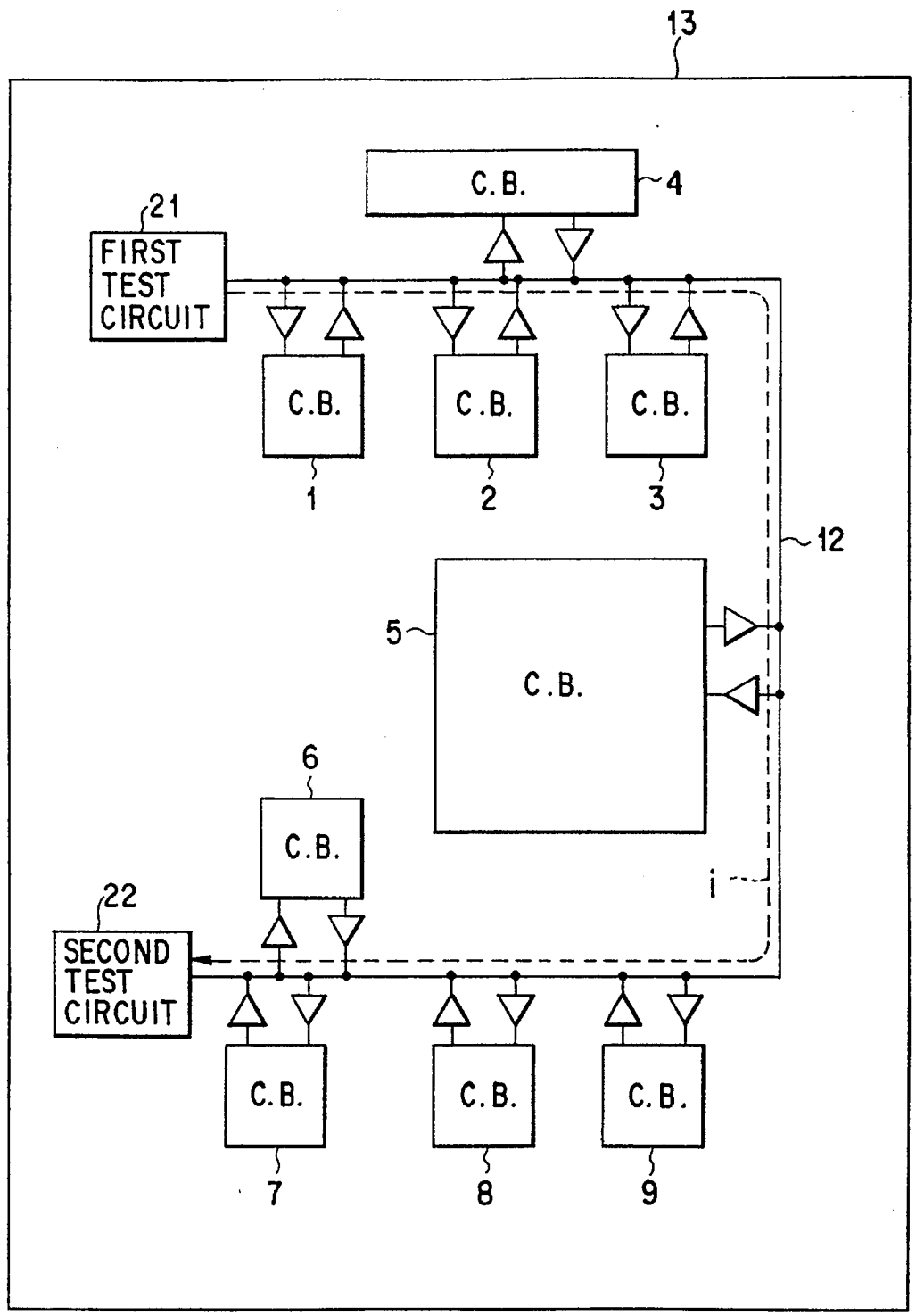
FIG. 9 is a circuit diagram showing another example of a conventional test circuit.
Figure 10:
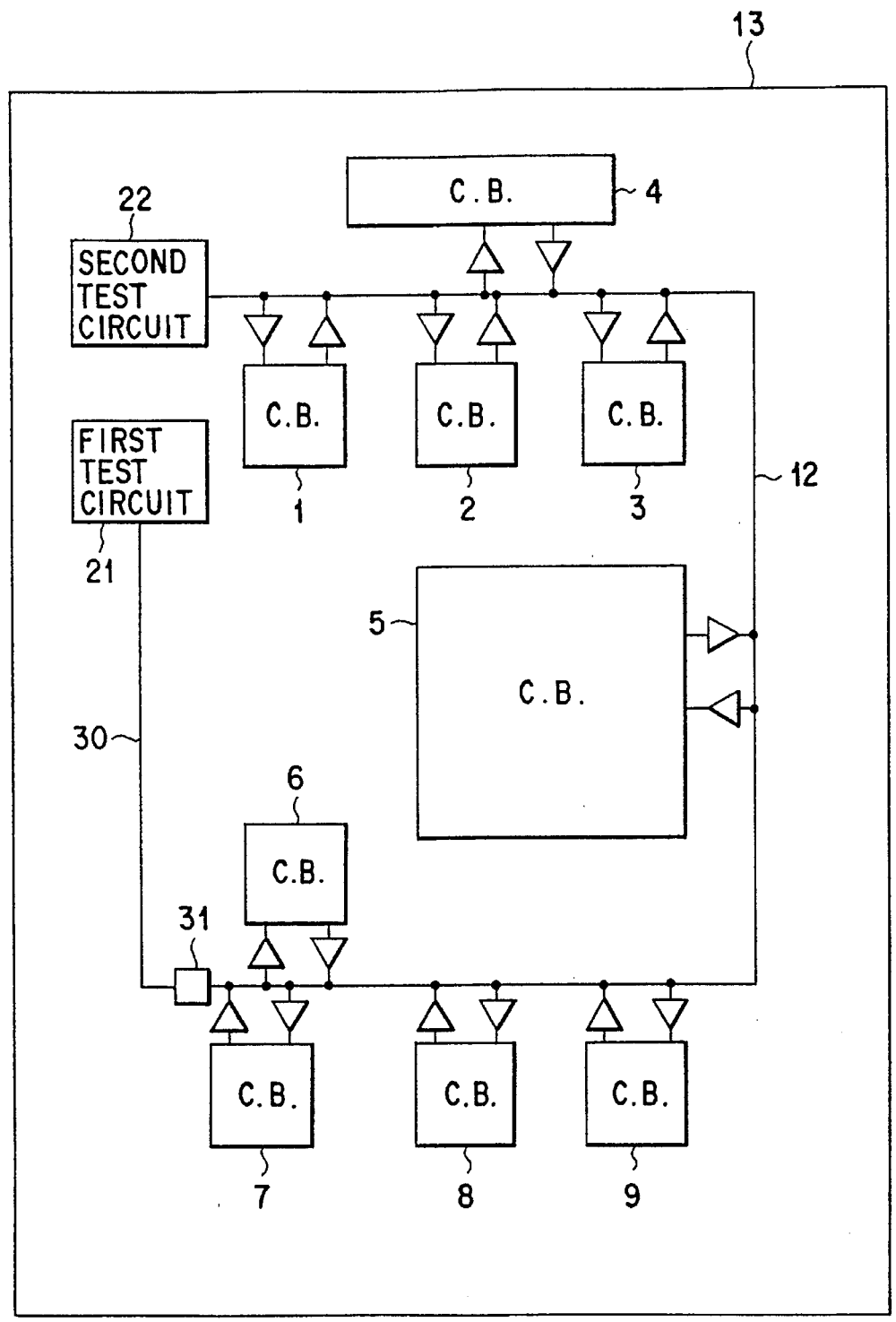
FIG. 10 is a circuit diagram showing still another example of a conventional test circuit.
Figure 11:
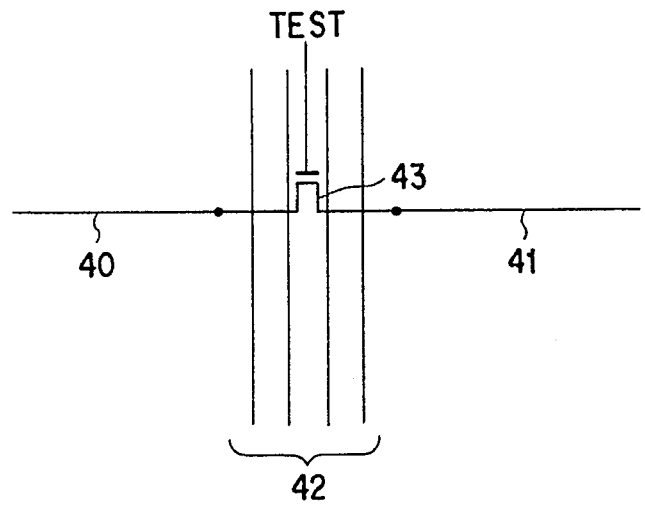
FIG. 11 is a circuit diagram showing the major portion of a conventional test circuit.
Figure 12A:
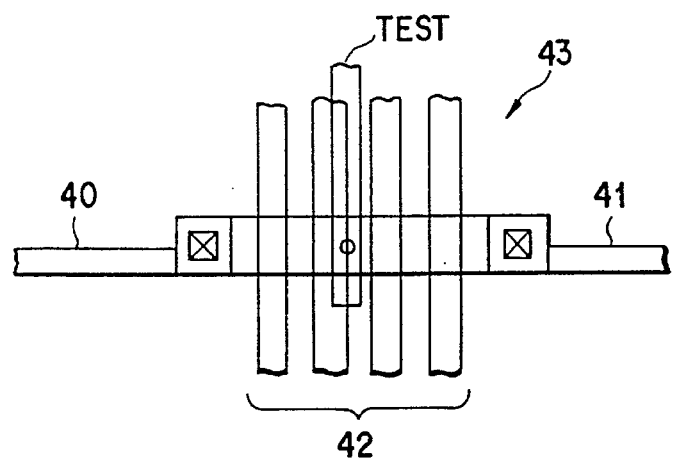
FIG. 12A is a plan view showing the pattern layout of the major portion depicted in FIG. 11.
Figure 12B:
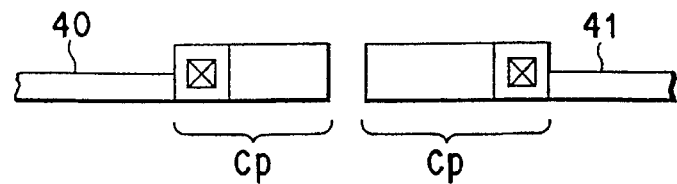
FIG. 12B is a plan view showing the state where the transistor depicted in FIG. 12A is in the OFF state.

Embodiments of the present invention will be described with reference to the accompanying drawings.

Referring to FIGS. 1 and 2, a first test circuit 21 is connected to one end of a wiring line 40, and a second test circuit 22 is connected to one end of another wiring line 41 (which serves as a data bus). Circuit elements are connected to the wiring line 41. N-channel MOS transistors 50 and 51, which are connected in series, are provided between the two wiring lines 40 and 41 and located below wiring lines 42. In other words, MOS transistors 50 and 51 are formed in a semiconductor substrate (not shown). An insulating layer (not shown) is formed on the MOS transistors 50 and 51, and the wiring lines 42 are located on the insulating layer. One end (source) of the current path of transistor 50 is connected to the other end of wiring line 40, and the other end (drain) thereof is connected to one end (source) of the current path of transistor 51. The other end (drain) of the current path of transistor 51 is connected to the other end of wiring line 41. The gates G of the transistors 50 and 51 are connected to a test control circuit 53 and receive a gate control signal TEST output from the test control circuit 53.

In the above circuit configuration, the logical level of the gate control signal TEST is set to be "1" when a test is made. Therefore, the transistors 50 and 51 are simultaneously turned on, and the wiring lines 40 and 41 are electrically connected together by means of the transistors 50 and 51. In this state, a current is supplied from the first test circuit 21 toward the second test circuit 22 through the wiring lines 40 and 41 and transistors 50 and 51. The second test circuit 22 senses the current supplied thereto, so as to determine whether the wiring lines 40 and 41 have an electrical disconnection.

In the normal operation mode, the logical level of the gate control signal TEST is set to be "0". Therefore, the transistors 50 and 51 are turned off. The transistors 50 and 51 in this state are shown in FIG. 3. As is shown in FIG. 3, the capacitance of a source/drain region 52, which is cut off by the channel portions of the transistors 50 and 51, is isolated from the wiring lines 40 and 41. Therefore, both the capacitance of the source of transistor 50 and that of the drain of transistor 51 can be greatly reduced. When the transistors 50 and 51 are OFF, only the capacitance of the source/drain region 52 increases, and the capacitance connected to the wiring lines 40 and 41 does not increase. This holds true even of the case where the wiring lines 40 and 41 are very away from each other. In the normal operation mode, therefore, the operation speed of the integrated circuit is not adversely affected, and a large amount of current is prevented from being used in vain. In addition, the characteristic deterioration of the integrated circuit can be a minimum.

FIG. 4 shows the second embodiment of the present invention. In the second embodiment, two wiring lines, arbitrarily selected from four wiring lines, can be tested to check whether they have an electrical disconnection. Referring to FIG. 4, a first test circuit 21 is connected to one end of a wiring line 60, and a current is supplied from the first test circuit 21 to wiring line 60. A second test circuit 22 is connected to one end of each of other wiring lines 61–63 (which serve as data buses). Circuit elements (not shown) are connected to each of wiring lines 61–63. The second test circuit 22 senses a current supplied thereto through the corresponding wiring line. N-channel MOS transistors 64 and 65, which are connected in series, are provided between wiring lines 60 and 61 and located above wiring lines 42. Likewise, N-channel MOS transistors 66 and 67, which are connected in series, are provided between wiring lines 62 and 63 and located below wiring lines 42. One end (source) of the current path of transistor 64 is connected to the other end of wiring line 60, and the other end (drain) thereof is connected to one end (source) of the current path of each of transistors 65, 66 and 67. The other ends (drains) of the current paths of transistors 65, 66 and 67 are connected to the other ends of wiring lines 61, 62 and 63, respectively. The gates G of the transistors 64–67 are connected to a test control circuit 53 and receive a gate control signal TEST output from the test control circuit 53.

In the above circuit configuration, the logical level of the gate control signal TEST is set to be "1" when a test is made. Therefore, the transistors 64–67 are simultaneously turned on. In this state, a current is supplied from the first test circuit 21 to the wiring lines 61–63 by way of the transistors 64–67. Each second test circuit 22 senses the current supplied thereto through the corresponding wiring line, so as to determine whether the corresponding wiring line has an electrical disconnection. It should be noted that the second test circuits 22 may be operated at the same time or at different times. In the normal operation mode, the logical level of the gate control signal TEST is set to be "0". Therefore, all the transistors 64–67 are turned off, and wiring lines 61–63 are electrically disconnected from wiring line 60. In this case, however, the capacitance of each of wiring lines 61–64 does not increase, as can be understood from the explanation made with reference to the first embodiment.

In the above description of the second embodiment, reference was made to the case where four wiring lines are tested. Needless to say, however, the number of wiring lines tested is not limited to four, and an arbitrary number of wiring lines can be tested in the second embodiment.

In the second embodiment, the gates of the transistors 64–67 are connected in common to the same output terminal of the test control circuit 53. However, as long as all the transistors 64–67 can be turned off in the normal operation mode, they may be selectively turned on in the test mode in accordance with the purpose of the test.

FIG. 5 shows the third embodiment of the present invention. The third embodiment differs from the foregoing embodiments in that transistors 64–67 are selectively turned on. In FIG. 5, the structural elements corresponding to those shown in FIG. 4 are denoted by the same reference as used in FIG. 4. In the case of the third embodiment, the gates of transistors 64–67 are connected to different output terminals of a test control circuit 68, and different gate control signals TEST0 to TEST3 are produced from the output terminals. Thus, gate control signals TEST0, TEST1, TEST2 and TEST3 are supplied to the gates of transistors 64, 66, 67 and 65, respectively. In order to check the state of wiring lines 61–63 one by one, the gate control signals TEST0–TEST3 shown in FIG. 6 are output from the test control circuit 68. With the ON/OFF states of the transistors 64–67 being selectively controlled in this manner, the state of an arbitrarily-selected wiring line or lines can be checked.

FIG. 7 shows the fourth embodiment of the present invention. This embodiment is a modification of the first embodiment. In FIG. 7, the same reference symbols used in FIG. 1 are used to denote the corresponding or similar structural elements. Referring to FIG. 7, wiring lines 43 and 44 are arranged between wiring line 40 and wiring line 41. MOS transistors $50_1$ and $51_1$ are located between wiring line 40 and wiring line 43 and are connected in series to each other, and MOS transistors $50_2$ and $51_2$ are located between wiring line 43 and wiring line 44 and are connected in series to each other. Likewise, MOS transistors $50_n$ and $51_n$ are located between wiring line 44 and wiring line 41 and are connected in series to each other. The gates of the MOS transistors $50_1$ to $51_n$ are connected to a test control circuit 53. Wiring lines $42_1$ extend in the region above MOS transistors $50_1$ and $51_1$, and wiring lines $42_2$ extend in the region above MOS transistors $50_2$ and $51_2$. Likewise, wiring lines $42_n$ extend in the region above MOS transistors $50_n$ and $51_n$.

With the above circuit configuration, all MOS transistors $50_1$ to $50_n$ are simultaneously set in the conductive state in response to a gate control signal TEST output from the test control circuit 53. Therefore, wiring lines 43 and 44 located between wiring line 40 and wiring line 41 can be checked, together with wiring lines 40 and 41.

The present invention is in no way limited to the embodiments described above; it can be modified in various manners as long as the modifications do not depart from the spirit and scope of the present invention.

What is claimed is:

1. A test apparatus for a semiconductor integrated circuit, comprising:

a first test circuit for outputting a current when a test is made;

a first wiring line having a first end connected to said first test circuit;

a first transistor having a current path with a first end connected to a second end of said first wiring line;

a second transistor having a current path with a first end connected to a second end of the current path of said first transistor, said first and second transistors being simultaneously set in a conductive state when the test is made;

a second wiring line having a first end connected to a second end of said second transistor;

a second test circuit connected to a second end of said second wiring line, said second test circuit detecting a current which is output from said first test circuit when the test is made and which is supplied thereto by way of said first and second transistors and said first and second wiring lines; and a third wiring line located between said second end of said first wiring line and said first end of said second wiring line, for transmitting a signal produced by said semiconductor integrated circuit during a normal operation mode, said third wiring line located on a first level which is different from a second level on which said first transistor and said second transistor are arranged, wherein said first and second wiring lines a smaller capacitance when said first and second transistors are set in an OFF sate than when said first and second transistors are set in an ON state.

2. The apparatus according to claim 1, wherein said first and second transistors are located below said third wiring line.

3. The apparatus according to claim 1, wherein said second wiring line is a data bus to which circuit elements are connected.

4. A test apparatus for a semiconductor integrated circuit, comprising:

a first test circuit for outputting a current when a test is made;

a first wiring line having a first end connected to said first test circuit;

a first transistor having a current path with a first end connected to a second end of said first wiring line;

a plurality of second transistors each having a current path with a first end connected to a second end of the current path of said first transistor;

a plurality of second wiring lines each having a first end connected to a second end of one of said second transistors, respectively;

a plurality of second test circuits each connected to a second end of one of said second wiring lines, respectively, said second test circuits detecting a current which is output from said first test circuit when the test is made and which is supplied thereto by way of said first transistor, said second transistors, said first wiring line, and said second wiring lines;

control means for setting simultaneously said first transistor and at least one of said second transistors in a conductive state when the test is made, and for setting said first transistor and second transistors in an OFF state when said semiconductor integrated circuit is operated in a normal operation mode; and a third wiring line located between said second end of said first wiring line and said first end of said second wiring line, for transmitting a signal produced by said semiconductor integrated circuit during the normal operation mode, said third wiring line located on a first level which is different from a second level on which said first transistor and said second transistor are arranged, wherein said first and second wiring lines have a smaller capacitance when said first and second transistors are set in an OFF state than when said first and second transistors are set in an ON state.

5. The apparatus according to claim 4, wherein said control means simultaneously sets said first transistor and said second transistors in an ON state when the test is made.

6. The apparatus according to claim 4, wherein said control means sets said first transistor and one of said second transistors in an ON state when the test is made.

7. The apparatus according to claim 4, wherein said first transistor and said second transistors are located below said third wiring line.

8. The apparatus according to claim 4, wherein each of said second wiring lines is a data bus to which circuit elements are connected.

9. A test apparatus for a semiconductor integrated circuit, comprising:

a first wiring line;

a second wiring line;

a first test circuit connected to a first end of said first wiring line, for outputting a current when a test is made;

a second test circuit connected to a first end of said second wiring line;

a plurality of transistors having current paths connected in series between a second end of said first wiring line and a second end of said second wiring line, said transistors being simultaneously set in a conductive state when the test is made, thereby permitting the current output from said first test circuit and flowing through said first wiring line to be supplied to said second test circuit by way of said second wiring line, said second test circuit detecting a current supplied thereto through said second wiring line when the test is made; and a third wiring line located between said second end of said first wiring line and said second end of said second wiring line, for transmitting a signal produced by said semiconductor integrated circuit during a normal operation mode, said third wiring line located on a first level which is different from a second level on which said transistors are arranged, wherein said first and second wiring lines have a smaller capacitance when said transistors are set in an OFF state than when said transistors are set in an ON state.

10. The apparatus according to claim 9, wherein said transistors are located below said third wiring line.

11. The apparatus according to claim 9, wherein said second wiring line is a data bus to which circuit elements are connected.

12. The apparatus according to claim 9, wherein at least two of said transistors are conductive in the test mode.

13. The apparatus according to claim 1, further including a control means for controlling said first and second transistors to be in an ON state during a test mode, wherein said first and second test circuits are electrically connected, and to be in an OFF state during a normal operation mode, wherein said first and second test circuits are not electrically connected.

14. A test apparatus for a semiconductor integrated circuit, comprising:

a first test circuit for outputting a current when a test is made;

a first wiring line having a first end connected to said first test circuit;

a first transistor having a current path with a first end connected to a second end of said first wiring line;

a second transistor having a current path with a first end connected to a second end of the current path of said first transistor, said first and second transistors being simultaneously set in a conductive state when the test is made, and wherein said first and second transistors are formed in a substrate;

a second wiring line having a first end connected to a second end of said second transistor;

a second test circuit connected to a second end of said second wiring line, said second test circuit detecting a current which is output from said first test circuit when the test is made and which is supplied thereto by way of said first and second transistors and said first and second wiring lines; and a third wiring line located between said second end of said first wiring line and said first end of said second wiring line, for transmitting a signal produced by said semiconductor integrated circuit during a normal operation mode, said third wiring line located on an insulating layer formed on the substrate, wherein said first and second wiring lines have a smaller capacitance when said first and second transistor are set in an OFF state than when said first and second transistors are in an ON state.

* * * * *